United States Patent [19]
DiMatteo et al.

[11] Patent Number: 4,998,233
[45] Date of Patent: Mar. 5, 1991

[54] ACQUIRING FOCUS IN OPTICAL SYSTEMS USING A FOCUS ERROR SIGNAL AND A LASER DRIVE SIGNAL

[75] Inventors: Joseph H. DiMatteo, Laguna Niguel, Calif.; Alan A. Fennema, Tucson, Ariz.; Benjamin C. Fiorino, Tucson, Ariz.; Julian Lewkowicz, Tucson, Ariz.

[73] Assignee: International Business Machines Corporation, Armonk, N.Y.

[21] Appl. No.: 155,390

[22] Filed: Feb. 12, 1988

[51] Int. Cl.$^5$ .............................................. G11B 7/95
[52] U.S. Cl. .............................. 369/44.25; 369/44.27; 369/54; 369/110
[58] Field of Search .......... 250/201 DF, 201.1, 201.5; 346/33 A, 107 B, 107 MP; 350/255; 369/53–55, 58, 110, 116, 44.25, 44.27, 44.34, 44.41, 44.15; 353/76; 354/404, 409; 355/56; 356/123

[56] References Cited

U.S. PATENT DOCUMENTS

| | | |
|---|---|---|
| 3,949,387 | 4/1976 | Chaudhari et al. |
| 3,952,191 | 4/1976 | Tinet . |
| 4,051,329 | 9/1977 | Blondet et al. ...................... 369/45 |
| 4,190,775 | 2/1980 | Sakurai et al. ..................... 250/570 |
| 4,357,696 | 11/1982 | Bierhoff et al. .................... 369/45 |
| 4,368,526 | 1/1983 | Hangae et al. ..................... 369/45 |
| 4,439,848 | 3/1984 | Ceshkovsky et al. ............... 369/45 |
| 4,446,546 | 5/1984 | Miller ...................... 250/201 DF X |
| 4,509,156 | 4/1985 | Ohara et al. ....................... 369/45 |
| 4,512,003 | 4/1985 | Kimura et al. .......... 250/201 DF X |
| 4,541,084 | 9/1985 | Oku et al. ............................ 369/45 |
| 4,544,837 | 10/1985 | Tanaka et al. ............... 250/201 DF |
| 4,604,739 | 8/1986 | Cohen .................................. 369/45 |
| 4,636,625 | 1/1987 | Emoto et al. ..................... 369/45 X |
| 4,700,056 | 10/1987 | Silvy et al. ........................ 369/45 X |
| 4,703,466 | 10/1987 | Konno ................................. 369/45 |
| 4,723,234 | 2/1988 | Katsuyama et al. ............. 369/54 X |
| 4,740,679 | 4/1988 | Doi ................................... 369/45 X |
| 4,762,986 | 8/1988 | Suda et al. .......................... 250/201 |
| 4,789,974 | 12/1988 | Satoh et al. ....................... 369/54 X |
| 4,794,581 | 12/1988 | Andresen ........................ 369/44.15 |
| 4,813,034 | 3/1989 | Mashimo .......................... 369/54 X |
| 4,841,370 | 6/1989 | Murashima et al. ............. 354/404 X |
| 4,858,219 | 8/1989 | Yoshikawa ....................... 369/54 X |

FOREIGN PATENT DOCUMENTS

| | | |
|---|---|---|
| 0220039 | 4/1987 | European Pat. Off. . |
| 0234594 | 9/1987 | European Pat. Off. . |
| 63-13261 | 3/1988 | Japan . |

Primary Examiner—Aristotelis M. Psitos
Assistant Examiner—W. R. Young
Attorney, Agent, or Firm—H. F. Somermeyer

[57] ABSTRACT

A focus acquire circuit for use in optical systems, such as optical data recorders and players, uses up to three parameters signals to indicate an in-focus condition. The zero crossing of a focus error signal is combined with a signal indicating that the focus error signal has approached a peak value and with a signal indicating a change in laser drive signal amplitude to indicate an in-focus condition. Various circuit details are illustrated showing how the three parameters cna be combined together for indicating an in-focus condition.

20 Claims, 3 Drawing Sheets

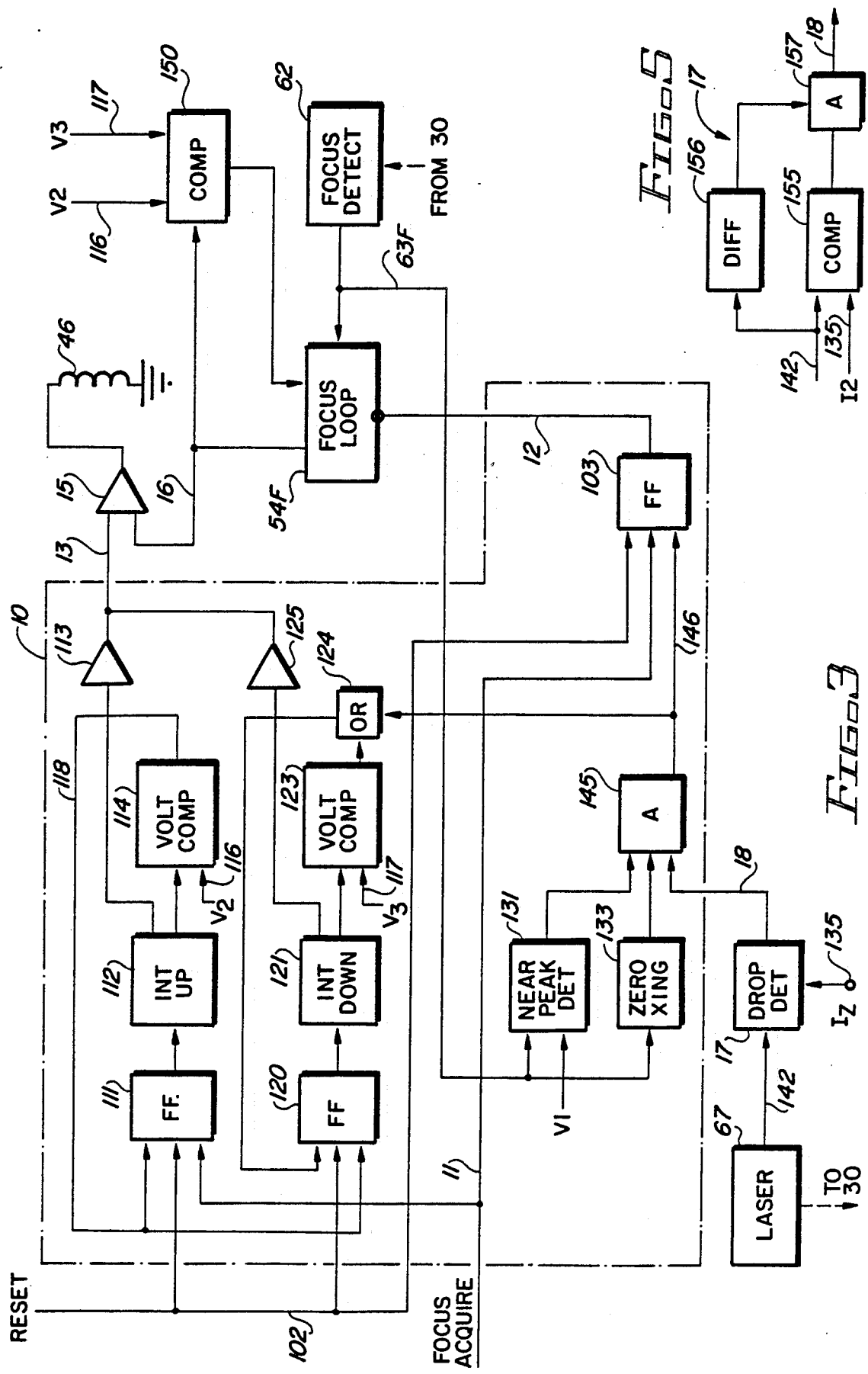

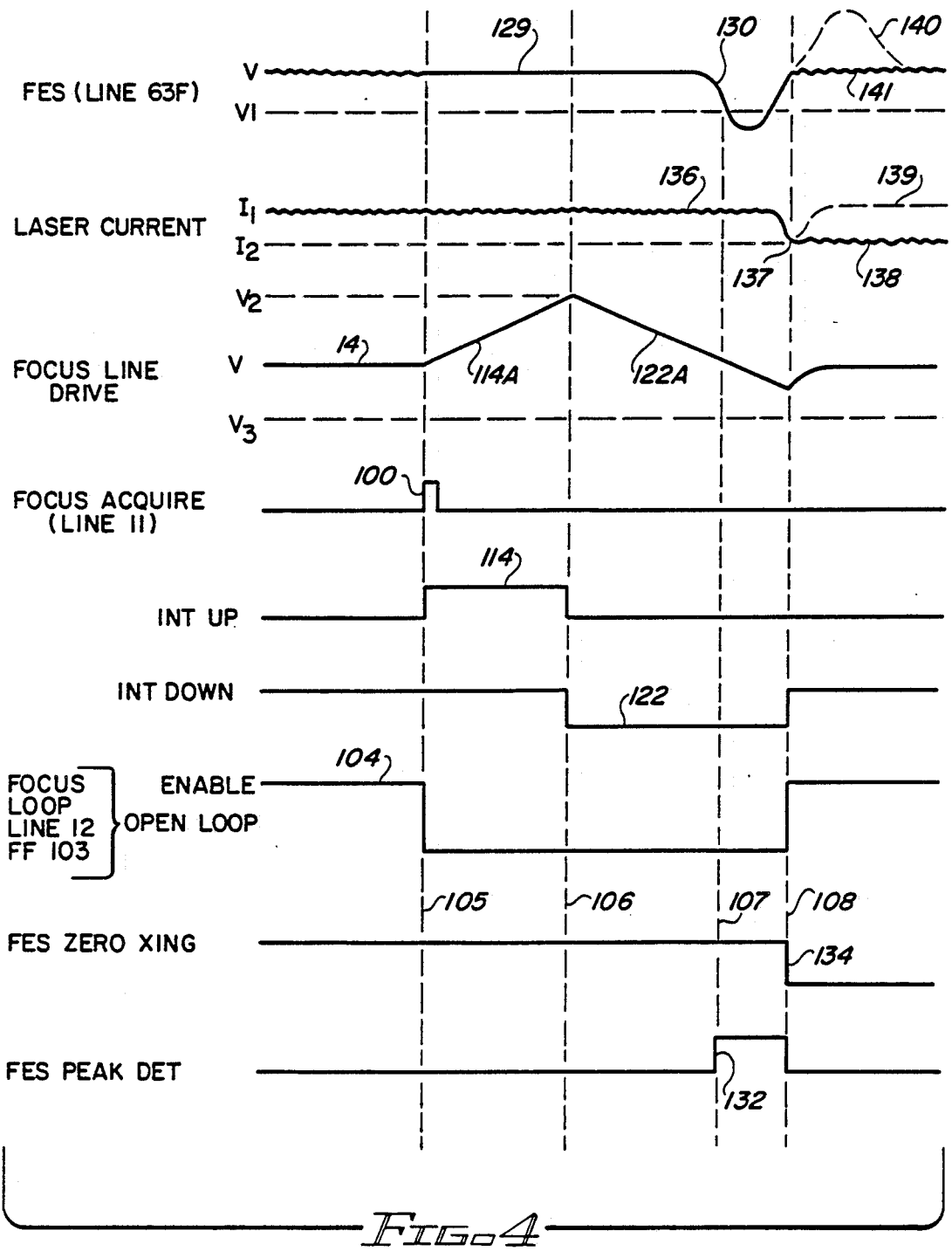

ACQUIRING FOCUS IN OPTICAL SYSTEMS USING A FOCUS ERROR SIGNAL AND A LASER DRIVE SIGNAL

DOCUMENT INCORPORATED BY REFERENCE

Ohara et al., U.S. Pat. No. 4,509,156 (priority Japan Application No. 56-193971, filed Dec. 1, 1981) is incorporated by reference for its showing of a constant power light intensity emission from a semiconductor diode in a read or reproduce mode.

FIELD OF THE INVENTION

The present invention relates to optical focus systems, more particularly to the acquisition and detection of an in-focus condition.

DISCUSSION OF PRIOR ART

Many optical systems require precise focussing of a beam of radiation, such as a laser beam, for performing optically-related functions. In particular, optical disk recorders require a precise focus acquisition and maintenance system. Focus acquisition should not only be reliable, but also fast. When such optical disk recorders are employed for data recording, the initial shipment of an optical disk to a user usually results in an unrecorded disk. In contrast, video disks have the video recorded on the disk before shipment from a factory to a user. An example of such a video disk is shown in U.S. Pat. No. 4,439,848 to Ceshkovsky et al. This patent, which shows focus acquisition and maintenance, teaches that the video readback signal is used for determining, during a focus acquisition cycle, when the best in-focus condition has been reached However, for reliable operation, the readback signal indicating the in-focus condition, is sent as the lens is passing through the in-focus position with respect to the video disk As a result, a so-called "/kick-back" signal is used to move the lens further away from the disk for reapproaching the in-focus condition such that focus acquisition can reliably occur. While the system may readily apply to video disk, it is desired to provide a focus acquisition system which is independent of any recording on the disk, i.e., will work with unrecorded disks, and is independent of whether or not the disk surface has circumferentially extending grooves for indicating track positions Further, it is desired to avoid the "kickback" signal requirement.

Focus maintenance and focus acquisition systems have used a so-called focus error signal (FES) which is generated by one or more different forms of optical focus detectors. Such detectors receive light reflected from the optical disk or other item having a focus plane The focus error signal is characterized at the in-focus condition by a zero axis crossing. This phenomenon is shown in U.S. Pat. No. 4,439,848. Unfortunately, such zero axis crossings may occur other than at the true or optimum in-focus condition, i.e., a false in-focus state may exist That is a reason why a readback signal, such as a video signal, is often used for assuring that a true in-focus condition has been reached during a focus acquisition cycle. Various forms of using a readback information or tracking signal have been used in connection with detecting an FES zero axis crossing for indicating a true in-focus condition Using the readback signal for focus detection does not enable focus acquisition in unrecorded optical disks

SUMMARY OF THE INVENTION

In accordance with the invention, focus acquire apparatus and method includes sensing a laser drive current and upon detecting a change in the laser drive current, indicating an in-focus condition. In the preferred mode, a laser provides coherent light having a constant output light intensity. At in-focus, the laser drive current has a substantial amplitude reduction When the laser drive current reduces below a predetermined threshold an in-focus condition is indicated.

In a preferred form of the invention, a plurality of focus-indicating parameters are combined to indicate an in-focus condition. In a specific form of the invention, the above-mentioned laser drive current indication is combined with a zero crossing detection of a focus error signal for indicating in-focus condition. A further control is provided by detecting the lens approaching an in-focus condition and combining all three indications for indicating an in-focus condition.

The focus acquire circuit includes ramp generators having ramps limited by threshold voltages for moving the lens toward an in-focus position with respect to an optical focus plane for enabling focus acquisition while limiting the travel of a lens perpendicular to the focal plane being focused to.

In another aspect of the invention, an in-focus condition is indicated by the zero axis crossing of a focus error signal as filtered by parameter signals derived from the current position of the lens with respect to a desired focal plane. The parameter signals indicate varying and in-focus conditions. In a preferred form of the invention, the focus error signal zero crossing is filtered by a net change in the laser drive signal wherein the laser provides a constant output light intensity radiation beam.

The foregoing and other objects, features, and advantages of the invention will be apparent from the following more particular description of preferred embodiments of the invention, as illustrated in the accompanying drawings

BRIEF DESCRIPTION OF THE DRAWINGS

FIG. 3 is an expanded block diagram of the focus acquire portion of the FIG. 1-illustrated focus system.

FIG. 4 is a set of idealized signal wave forms which illustrate the operation of the FIG. 3-illustrated circuit FIG. 5 is a simplified block diagram of one alternative arrangement for detecting a change in laser drive signal for indicating an in-focus condition.

DETAILED DESCRIPTION OF THE DRAWINGS

Figure 1:
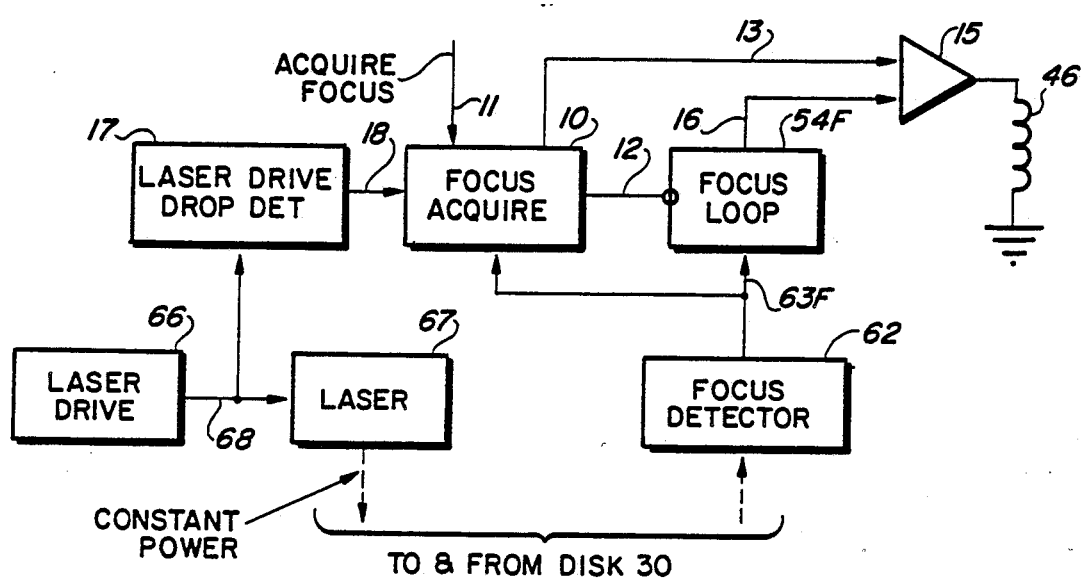
FIG. 1 is a simplified block diagram of a focus system employing the present invention.

Referring now more particularly to the drawing, like numerals indicate like parts and structural features in the various figures As best seen in FIG. 1, focus acquire circuits 10, detailed in FIG. 3, respond to an acquire focus command received over line 11 to establish an in-focus condition of lens 45 through fine actuator 46. Focus acquire circuits 10 supply a disable signal over line 12 to disable the focus maintenance loop 54F, which is a portion of the focus and tracking circuits 54 shown in FIG. 2. Focus acquire circuits 10 supply a focus acquiring actuator drive signal over line 13 through power amplifier 15 to the actuator 46. For focus acquisition, laser 67 supplies a constant intensity output beam of radiation to disk 30 (FIG. 2) to be reflected by disk 30 through later described optics to focus detector 62 Focus detector 62 supplies a focus error signal (FES) over line 63F to focus loop 54F and to focus acquire circuits 10, as detailed in FIG. 3. Focus acquire circuits 10 respond to FES on line 63F for controlling indication of a focus require for re-enabling focus loop 54F operation. Additionally, the laser drive circuit 66 supplied laser drive signal over line 68 to laser 67 is measured by the laser drive drop detector 17; that is, when the detector lens 17 reaches an in-focus condition and detects a predetermined reduction in laser drive signal to laser 67. Such reduction in laser drive current is required at in-focus to enable the laser to maintain the constant power output radiation beam. Detector 17 then supplies an in-focus indicating signal over line 18 to focus acquire circuits 10. Circuits 10 combine the FES signal on line 63F with the laser drive in-focus signal to remove the lens drive signal from line 13 and enable focus loop 54F.

Figure 2:
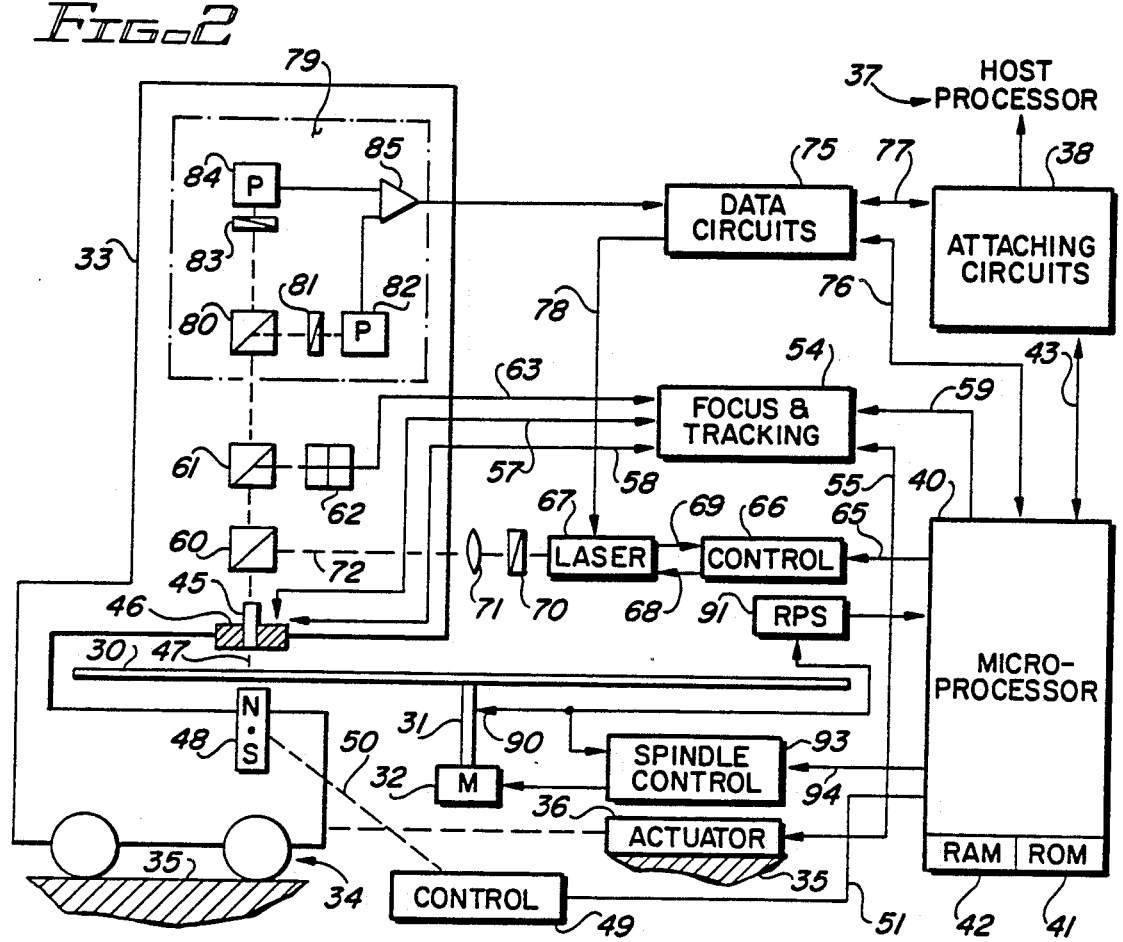
FIG. 2 is a magnetooptic data recorder and player with which the FIG. 1-focussing system may be successfully employed.

An optical recorder with which the present invention may be advantageously employed is shown in FIG. 2. A magnetooptic record disk 30 is mounted for rotation on spindle 31 by motor 32. Optical head carrying arm 33 on head arm carriage generally denoted by numeral 34 moves radially of disk 30. A frame 35 of recorder suitably mounts carriage 34 for reciprocating radial motions The radial motions of carriage 34 enable access to anyone of a plurality of concentric tracks or circumvolutions of a spiral track for recording and recovering data on and from the disk. Linear actuator suitably mounted on frame 35, radially moves carriage 34 for enabling the track accessing. The recorder is suitably attached to one or more host processors 37, such host processors may be control units, personal computers, large system computers, communication systems, image process processors, and the like. Attaching circuits 38 provide the logical and electrical connections between the optical recorder and the attaching host processors 37.

Microprocessor 40 controls the recorder including the attachment to the host processor 37. Control data, status data, commands and the like are exchanged between attaching circuits 38 and microprocessor 40 via bidirectional bus 43. Included in microprocessor 40 is a program or microcode storing read only memory (ROM) 41 and a data and control signal storing random access memory (RAM) 42.

The optics of the recorder include an objective or focussing lens 45 mounted for focussing and tracking motions on head arm 33 by fine actuator 46. This actuator includes mechanisms for moving lens 45 toward and away from disk 30 for focussing and track following and seeking movements radially of disk 30; for example, for changing tracks within a range of 100 tracks so that carriage 34 need not be actuated each time a track adjacent to a track currently being accessed is to be accessed Numeral 47 denotes the two-way light path between lens 45 and disk 30.

In magnetooptic recording, magnet 48 provides a weak magnetic steering field for directing the remnant magnetization direction of a small spot on disk 30 illuminated by laser light from lens 45. The laser light spot heats the illuminate spot on the record disk to a temperature above the Curie point of the magnetooptic layer (not shown, but can be an alloy of rare earth and transitional metals as taught by Chaudhari et al. U.S. Pat. No. 3,949 387). This heating enables magnet 48 to direct the remnant magnetization to a desired direction of magnetization as the spot cools below the Curie point temperature Magnet 48 is shown as oriented in the "write" direction, i.e. binary ones are recorded on disk 30 normally are "north pole remnant magnetization". To erase disk 30, magnet 48 rotates so the south pole is adjacent disk 30. Magnet 48 control 49 which is mechanically coupled to rotatable magnet 48 as indicated by dashed line 50, controls the write and erase directions Microprocessor 40 supplies control signals over line 51 to control 49 for effecting reversal of the recording direction.

It is necessary to control the radial position of the beam following path 47 such that a track or circumvolution is faithfully followed and that a desired track or circumvolution is quickly and precisely accessed To this end, focus and tracking circuits 54 control both the coarse actuator 36 and fine actuator 46. The positioning of carriage 34 by actuator 36 is precisely controlled by control signals supplied by circuits 54 over line 55 to actuator 36. Additionally the actuator control by circuits 54 is exercised by control signals travelling over lines 57 and 58 respectively for focus and fine tracking and switching actions of fine actuator 46.

The focus and tracking position sensing is achieved by analyzing laser light reflected from disk 30 over path 47, thence through lens 45, through one-half mirror 60 and to be reflected by half-mirror 61 to a so-called "quad detector" 62. Quad detector 62 has four photo elements which respectively supply signals on four lines collectively denominated by numeral 63 to focus and tracking circuits 54. Aligning one axis of the detector 62 with a track center line, track following operations are enabled. Focussing operations are achieved by comparing the light intensities detected by the four photo elements in the quad detector 62. Focus and tracking circuits 54 analyze the signals on lines 63 to control both focus and tracking Recording or writing data onto disk 30 is next described. It is assumed that magnet 48 is rotated to the desired position for recording data. Microprocessor 40 supplies a control signal over line 65 to laser control 66 for indicating that a recording operation is to ensue. This means that laser 67 is energized by control 66 to emit a high intensity laser light beam for recording; in contrast, for reading, the laser 67 emitted laser light beam is a reduced constant intensity for limiting heating the laser illuminated spot on disk 30 to below the Curie point. Control 66 supplies its control signal over line 68 to laser 67 and receives a feedback signal over line 69 indicating the laser 67 emitted light intensity. Control 68 adjusts the light intensity to the desired constant value Laser 67, a semiconductor laser such as a Gallium arsenide diode laser, can be modulated by data signals so the emitted light beam represents the data to be recorded by such intensity modulation. In this regard, data circuits 75 (later described) supply data indicating signals over line 78 to laser 67 for effecting such modulation. This modulated light beam passes through polarizer 70 (linearly polarizing the beam), thence through collimating lens 71 toward half mirror 60 for being reflected toward disk 30 through lens 45. Data circuits 75 are prepared for recording the microprocessor 40 supplied suitable control signals over line 76. Microprocessor 40 in preparing circuits 75 responds to commands for recording received from a host processor 37 via attaching circuits 38 Once data circuits 75 are prepared, data is transferred directly between host processor 37 data circuits 75 through attaching circuits 38 Data circuits 75 also ancillary circuits (not shown) relating to disk 30 format signals, error detection and correction and the like. Circuits 75, during a read or recovery action strip the ancillary signals from the readback signals before supplying corrected data signals over bus 77 to host processor 37 via attachment circuits 38.

Reading or recovering data from disk 30 for transmission to a host processor requires optical and electrical processing of the laser light beam from the disk 30. That portion of the reflected light (which has its linear polarization from polarizer 70 rotated by disk 30 recording using the Kerr effect) travels along the two-way light path 47, through lens 45 and half-mirrors 60 and 61 to the data detection portion 79 of the head arm 33 optics. Half-mirror or beam splitter 80 divides the reflected beam into two equal intensity beams both having the same reflected rotated linear polarization. The half-mirror 80 reflected light travels through a first polarizer 81 which is set to pass only that reflected light which was rotated when the remnant magnetization on disk 30 spot being accessed has a "north" or binary one indication. This passed light impinges on photo cell 82 for supplying a suitable indicating signal to differential amplifier 85. When the reflected light was rotated by a "south" or erased pole direction remnant magnetization, then polarizer 81 passes no or very little light resulting in no active signal being supplied by photocell 82. The opposite operation occurs by polarizer 83 which passes only "south" rotated laser light beam to photo cell 84. Photocell 84 supplies its signal indicating its received laser light to the second input of differential amplifier 85. The amplifier 85 supplies the resulting difference signal (representing data) to data circuits 75 for detection. The detected signals include not only data that is recorded but also all of the so-called ancillary signals as well. The term "data", as used herein, is intended to include any and all information-bearing signals, preferably of the digital or discrete value type. The rotational position and rotational speed of spindle 31 is sensed by a suitable tachometer or emitter sensor 90. Sensor 90, preferably of the optical sensing type that senses dark and light spots on a tachometer wheel (not shown) of spindle 31, supplies the "tach" signals (digital signals) to RPS circuit 91, which detects the rotational position of spindle 31 and supplies rotational information-bearing signals to microprocessor 40. Microprocessor 40 employs such rotational signals for controlling access to data storing segments on disk 30 as is widely practiced in the magnetic data storing disks Additionally, the sensor 90 signals also travel to spindle speed control circuits 93 for controlling motor 32 to rotate spindle 31 at a constant rotational speed. Control 93 may include a crystal controlled oscillator for controlling motor 32 speed, as is well known. Microprocessor 40 supplies control signals over line 94 to control 93 in a usual manner.

FIGS. 3 and 4 illustrate the present invention in a preferred form. FIG. 3 shows circuits for implementing the invention, while FIG. 4 shows idealized signal waveforms which illustrate the operation of the FIG. 3-illustrated circuits At power-on time or while performing certain operational resets wherein the operation of all circuits are reset to a reference condition, a reset pulse is supplied over line 102 for conditioning the focus acquire circuit 10 to a reference or initial state This reference state opens both the tracking and focus servo loops and gives actuator 36 zero drive current. After the circuits, such as shown in FIG. 2, have been reset to this reference state, microprocessor 40 using its known disk recorder initializing algorithms, issues a focus acquire command signal over line 11 to focus acquire circuits 10 for conditioning those circuits to actuate actuator 46 to move lens 45 toward an in-focus condition. Firstly, focus acquire signal 100 sets flip-flop (FF) 103 to the acquire state. This action causes FF 103 to supply a focus loop disable signal over line 12 to focus loop 54F to open or disable the focus loop 54F until focus has been acquired It should be noted that reset signal 102 initially reset FF 103 to the focus loop 54F enabling state. Signal 104 found on line 12, disables focus loop 54F at vertical dash line 105 which corresponds to the occurrence of focus acquire signal 100. The line 12 signal 104 goes to the open loop or disable loop 54F state. Signal 104 remains in the open loop state until an in-focus condition is detected, as represented by vertical dash line 108. Focus acquisition cycle has three phases, between vertical dashed lines 105 and 106 lens 45 is moved away from the optical disk 30 toward a most remote travel position represented by reference voltage V2. At dash line 106 the travel of lens 45 is reversed for moving it toward optical disk 30. When vertical dash line 107 is reached, the focus acquisition phase begins. Such focus acquisition phase, in a preferred embodiment, involves the FES signal 129, the laser current signal 136 and the FES drive signal zero crossing 133 detecting peak detector 132, all as will become apparent.

Focus acquire signal 100 also travels over line 11 to set FF 111 to a state for moving lens 45 away from disk 30. It should be noted that reset pulse on line 102, initially reset FF 111 to an inoperative state wherein no action or control is exercised by FF 111 over actuator 46 FF 112 set to the active condition actuates INT UP circuit 112 by signal 114 to generate a ramp signal 114A of the focus drive signal 14. Ramp signal 114A causes actuator 46 to move lens to the most remote position from disk 30, as represented by voltage V2. The ramp signal 114A travels from INT UP circuit 112 through isolating amplifier 113 to line 13. The second output signal from INT UP circuit 112 travels to voltage compare circuit 114, which receives V2 over line 116. When the INT UP 112 output signal equals V2, then voltage compare circuit 114 issues an output pulse corresponding to the timing of line 106 over line 118 to reset FF 111 to the inactive state. Simultaneously, the voltage compare output pulse on line 118 sets FF 120 to the active condition as shown by signal 122 resulting in ramp signal 122A being generated by INT DOWN circuit 121. Ramp signal 122A travels through isolating amplifier 125 to reach line 113 for completing a second portion of the focus drive signal 14. Ramp signal 122A causes actuator 46 to move the lens 45 toward disk 30. The closest position of lens 45 to disk 30 is represented by reference voltage V3 indicated in FIG. 4 by the dashed horizontal line. The operation is such that lens 45 never reaches a position corresponding to voltage V3, in that later described in-focus detection circuits interrupt the ramp signal 122A before V3 is reached. In the event a focus condition is not established, then voltage compare circuit 123 by detecting equality between voltage V3 on line 117 and the output signal from INT DOWN circuit 121, issues an output pulse through OR circuit 124 to reset flip-flop 120. This action aborts the ramp signal 122A for preventing moving the lens 45 closer to disk 30 than represented by voltage V3.

The in-focus condition indicated in a best mode of the invention is detected using three focus indicating parameters. FES on line 63F is a source for two of the in-focus indicating parameters. As lens 45 approaches the in-focus state represented by vertical line 108. FES goes through a single sine wave cycle having an onset indicated by a predetermined point with respect to the zero crossing in-focus indicating of FES 129 varies with the design of a focus detector When FES 129 reaches threshold voltage V1, a near peak detector 131 indicates that the first peak of the single cycle sinusoid is being approached which indicates approachment of the in-focus condition. Near peak detector 131 is a voltage comparator which compares the voltage of FES 129 with the reference signal V1. The output signal 132 of FES near peak detector is signal 132 of FIG. 4.

The second FES parameter is detected by zero crossing detector circuit 133, which responds to the FES 129 zero crossing to generate signal transition 134. The third parameter, in-focus input is the reduction of laser drive current drive signal received over line 142 from laser 67. The laser current drop detector 17 compares the laser drive signal amplitude on line 142 with the reference signal I2 on line 135. When equality between I2 and the line 142 signal is detected, as at point 137 of the laser current signal 136, detector 17 outputs a signal over line 18 corresponding to the horizontal dash line 108. AND circuit 145 receives the output signals from circuits 17, 131 and 133. When all three parameter signals are simultaneously present, AND circuit 145 outputs a signal substantially time coincident with vertical dash line 108 for resetting FF 103 to the focus loop 54F enabling state. Simultaneously, the line 146 signal also passes through OR circuit 124 for resetting FF 120 to terminate ramp signal 122A and turn off INT DOWN circuit 121 (terminates focus acquisition). When focus is successfully acquired, the laser current remains at amplitude I2, as represented by numeral 138. In the rare event that focus is not actually acquired, then the laser current increases as represented by dash line 139, which is useful for indicating an out-of-focus state Dash line 140 represents the shape of FES 129 for the event that focus is not acquired. Numeral 141 indicates FES 129 when focus is acquired.

Voltages V2 and V3, which respectively represent the most remote position of lens 45 and the closest position of lens 45 with respect to disk 30, can be used to disable focus loop 54F. The line 16 drive signal is integrated within comparator 150 and compared with V2 and V3 signals respectively on lines 116 and 117. Comparator 150, upon detecting integrated values exceeding V2 or V3, sends a control signal to focus loop 54F for limiting its operation.

FIG. 5 illustrates a modification of laser drive current loop detector 17. The laser drive signal received over line 142 goes to comparator 155 to be compared with the value I2 on line 135. The line 142 signal is also differentiated for detecting a peak of the laser drive current by differentiator 156. The output signals of circuits 155 and 156 are logically ANDed together in AND circuit 157 for supplying an in-focus parameter signal over line 18.

While the invention has been particularly shown and described with reference to its preferred embodiments thereof, it will be understood by those skilled in the art that various changes in form and details may be made therein without departing from the spirit and scope of the invention.

What is claimed is:

1. In an optical apparatus employing an optical focus mechanism having a lens moveable toward the away from a focussing plane:
   reflective means disposed at the focussing plane;
   a laser means including a laser element and a laser drive circuit means for supplying a laser drive signal to the laser element for causing the laser element to emit a light beam toward said focussing plane to be reflected by said reflective means;
   a detector in optical communication with the reflective means for receiving the reflected light beam and generating a focus error signal indicative of the focus condition of the lens in its current position with respect to the focussing plane;
   a focus servo circuit connected to said focus mechanism and to said detector for receiving the focus error signal and for generating and supplying a focus drive signal to the focus mechanism for maintaining an in-focus condition of the lens;
   the improvement including, in combination:
   focus acquire circuit means connected to the focus mechanism and to said focus servo circuit means for simultaneously actuating the focus mechanism to move the lens toward an in-focus condition and disabling the operation of the focus servo circuit means;
   laser drive current sensing means connected to the laser element for sensing the amplitude of the laser drive current and upon detecting a predetermined reduction of laser drive current amplitude supplying a first in-focus indicating signal; and
   focus acquire detection means having in-focus detecting circuit means connected to the laser drive current sensing means, and to said focus servo circuit means, and to said focus acquire circuit means, for responding to said first in-focus indicating signal to substantially simultaneously re-enable said focus servo circuit means and to disable operation of the focus acquire circuit means.

2. In the optical apparatus set forth in claim 1, further including, in combination:
   focus error signal evaluation means optically coupled to said detector for receiving said focus error signal and for generating a second in-focus indicating signal from said focus error signal; and
   combining means in said in-focus detecting circuit means connected to said evaluation means and to said laser drive current sensing means for combining said first and second in-focus indicating signals for actuating said in-focus detection circuit means to substantially simultaneously re-enable the focus servo circuit means and disable operation of the focus acquire circuit means.

3. In the optical apparatus set forth in claim 2, further including, in combination:
   said evaluation means having an amplitude threshold means indicating an amplitude threshold and a comparator means for indicating when said focus error signal exceeds said amplitude threshold;
   a phase detector means in the evaluation means for detecting zero crossings of said focus error signal and supplying a third in-focus indicating signal whenever a zero crossing is detected; and said combining means receiving said third in-focus indicating signal and combining same with the first and second in-focus indicating signals for re-enabling the focus servo circuit means and disabling the focus acquire circuit means.

4. In the optical apparatus set forth in claim 3, further including, in combination:

said focus acquire circuit means including a first signal ramp generator for supplying a ramp signal for actuating the focus mechanism to move the lens to a remote position from the focussing plane;

a second ramp generator for actuating the focus mechanism to move the lens toward the focussing plane;

voltage threshold means in the focus acquire circuit means for indicating a maximal remote location of the lens with respect to the focussing plane;

first comparison circuit connected to the first ramp generator and to said voltage threshold means for terminating the first ramp generator circuit means and actuating the second ramp generator means such that the lens moves to said most remote position of said lens and then moves toward the focussing plane; and said second ramp generator means being connected to the in-focus detecting circuit means for responding to the disable operation of the focus acquire circuit means to terminate said second ramp at the in-focus position of the lens.

5. In the optical apparatus set forth in claim 4, further including, in combination:

a second voltage threshold circuit means for indicating a closest permitted position of the lens with respect to the focussing plane; and comparator means connected to the second voltage threshold circuit means and to said second ramp generator for comparing the amplitude of the second ramp with the voltage threshold for terminating the ramp signal when the two signals are equal.

6. In the optical apparatus set forth in claim 5, further including, in combination:

said reflective means being an optical record disk rotatably mounted in the optical apparatus;

said laser means emitting a constant intensity radiation beam toward the optical disk;

a third voltage threshold circuit means; and a third comparator means in said laser drive current sensing means for receiving the laser drive current and comparing same with said third voltage threshold for generating said first in-focus indicating signal wherein said third voltage threshold represents laser drive current amplitude at an in-focus condition of said radiation beam on said optical disk.

7. In the optical apparatus set forth in claim 6, further including, in combination:

reset means connected to the focus acquire circuit means and to the in focus detecting circuit means for initially resetting said acquire and detecting circuit means to a state enabling operation of the focus servo circuit means and disabling operation of the focus acquire circuit means; and focus acquire initiating means coupled to said focus acquire circuit means and to said focus servo circuit means for activating operation of the focus acquire circuit means and deactivating operation of the focus servo circuit means.

8. In an optical apparatus having a focus plane with reflective means at the focus plane:

laser means for emitting a radiation beam having an axis and being in optical communication with the reflective means such that the reflective means reflects the radiation beam as a reflected beam;

a focussing lens optically interposed between the laser means and the reflective means for focussing the radiation beam onto the reflective means and for transmitting the reflected beam;

a focus mechanism mounting the lens for movement along the axis of the radiation beam for effecting said focussing;

detecting means in optical communication with the lens for receiving said reflected beam for detecting and electrically indicating a focus error and supplying a focus error signal having amplitude and phase parameters both for indicating focus and out of focus conditions;

the improvement including, in combination:

focus acquire means operatively connected to the focus detector and to said focus mechanism for actuating the focus mechanism to move the lens toward an in-focus condition;

focus error signal parameter detector in the acquire means connected to the focus detection means for receiving said focus error signal for detecting one of said parameters for supplying an in-focus possible signal;

a laser drive current detector electrically connected to the laser means for receiving an indication of the laser drive signal amplitude and being responsive thereto to detect a decrease in drive signal amplitude and to supply an in-focus reasonable signal when said signal amplitude decrease is detected;

in-focus detection means operatively coupled to said detectors for receiving said in-focus signals and for combining the received in-focus signals to generate a focus acquired signal when both of the in-focus signals indicate an in-focus condition; and focus maintenance means connected to said in-focus detection means for receiving said focus acquired signal and to said focus mechanism and focus detection means for maintaining the just acquired in-focus condition.

9. In the optical apparatus set forth in claim 8, wherein said parameter detector has means for analyzing the phase parameter of the focus error signal for detecting and indicating a zero crossing of the focus error signal for generating said in-focus possible signal.

10. In the optical apparatus set forth in claim 8, wherein said parameter detector has amplitude threshold means indicating an amplitude threshold indicative of a proximity to a true in-focus condition;

a given comparator means connected to the amplitude threshold means and to said focus detection means for comparing amplitude of the focus error signal with said amplitude threshold and for generating said in-focus possible signal when the focus error signal amplitude exceeds the amplitude threshold; and means coupled to the given comparator means for maintaining said in-focus possible signal for a predetermined time irrespective of whether or not the focus error signal amplitude reduces below said amplitude threshold.

11. In the optical apparatus set forth in claim 8, wherein said laser means supplies a constant intensity radiation beam.

12. In the optical apparatus set forth in claim 11, wherein said reflective means is an optical record disk rotatably mounted for being scanned by said radiation beam along tracks to contain an information-bearing signal; and separate means in optical communication with said lens for receiving said reflective beam for detecting said information-bearing signals.

13. In a method of operating an optical apparatus having a laser means which emits a beam of radiation toward a reflective means at a focussing plane with a lens optically interposed between the laser means and the reflective means and the reflective means for focussing the radiation beam at the reflected means and including a focus mechanism for moving the lens along the radiation beam to effect said focussing;

a focus servo loop connected to the focussing means and to a focus error detector for maintaining an in-focus condition;

the steps of:

disabling said focus servo loop from maintaining said in-focus condition;

moving the lens to a remote most location from said reflective means;

upon the lens reaching said remote-most position, moving the lens toward said reflective means at a given rate;

sensing said laser means by measuring a drive current used by the laser means to generate said radiation beam while said lens is moving toward said reflective means and detecting when the laser means drive current has been reduced a predetermined amplitude; and when said laser drive current has been reduced said predetermined amplitude, maintaining said lens at the position from said reflective means at which said laser current amplitude remains reduced said predetermined amount.

14. In the method set forth in claim 13, further including the steps of:

during the motion of said lens toward said reflective means analyzing the focus error signal by determining parameters of the focus error signal which indicate a proximity to a true in-focus condition of the radiation beam at said reflective means; and combining the focus error signal parameters with said reduced laser drive current detection for maintaining the lens at a position when both of said parameters have been simultaneously detected.

15. In the method set forth in claim 14, further including the step of:

analyzing a zero axis crossing of said focus error signal as said parameter.

16. In the method set forth in claim 15, further including the step of:

determining when the focus error signal has a predetermined maximum amplitude; and maintaining the focus condition only after said predetermined amplitude has been detected and said zero crossing is detected along with detection of said reduced laser drive current amplitude.

17. In a method of operating optional apparatus having a reflective mans along a focussing plane;

a laser means for emitting a radiation beam having an axis and being in optical communication with the reflective means such that the reflective means reflects the radiation beam as a reflected beam;

a focussing lens operatively interposed between the laser means and the reflective means for focussing the radiation beam onto the reflective means and being movably mounted between the laser means and reflective means for focussing same and for transmitting the reflected beam;

focus detection means in optical communication with the lens for receiving the reflected beam for detecting and indicating focus error for supplying a focus error signal having focus indicating parameters:

the steps of:

moving the lens along said axis towards said reflective means from a substantially out of focus condition toward an in-focus condition;

monitoring the focus error signal, detecting one of said parameters and generating and supplying an in-focus possible signal;

monitoring the operation of the laser means, including an amplitude of a drive current used in generating said radiation beam;

detecting a substantial decrease in the laser drive current amplitude and supplying an in-focus reasonable signal when said amplitude decrease is detected; and combining the two in-focus signals for indicating an in-focus condition of said lens, then stopping the lens transport toward said reflective means and maintaining the lens at said stopped position.

18. In the method set forth in claim 17, wherein the step of analyzing the focus error parameter includes:

detecting a zero crossing of the focus error signal

19. In the method set forth in claim 17, wherein said focus error parameter includes:

detecting the signal amplitude of the focus error signal and supplying said in-focus possible signal for a predetermined period of time after said focus error signal has reached a predetermined amplitude.

20. In the method set forth in claim 17, wherein said focus error parameter analysis includes:

detecting a maximal amplitude of the focus error signal and maintaining indication of the detected maximal amplitude for a predetermined time, thereafter detecting a zero axis crossing of the focus error signal and combining the two focus error parameters for generating said in-focus possible signal.

* * * * *